(12) United States Patent
Massidda et al.

(10) Patent No.: US 8,048,216 B2
(45) Date of Patent: Nov. 1, 2011

(54) ANTI-CORROSIVE PACKAGE

(76) Inventors: Joseph F. Massidda, Montross, VA (US); Allan P. Short, Daphne, AL (US)

( * ) Notice: Subject to any disclaimer, the term of this patent is extended or adjusted under 35 U.S.C. 154(b) by 1532 days.

(21) Appl. No.: 10/840,394

(22) Filed: May 6, 2004

(65) Prior Publication Data
US 2004/0207122 A1 Oct. 21, 2004

Related U.S. Application Data

(63) Continuation-in-part of application No. 10/321,517, filed on Dec. 18, 2002, now Pat. No. 7,018,461.

(60) Provisional application No. 60/359,379, filed on Feb. 26, 2002, provisional application No. 60/358,378, filed on Feb. 22, 2002.

(51) Int. Cl.
| | |
|---|---|
| B28B 7/36 | (2006.01) |
| B28B 7/38 | (2006.01) |
| C04B 35/66 | (2006.01) |
| C04B 14/00 | (2006.01) |
| C08L 91/00 | (2006.01) |
| C08L 95/00 | (2006.01) |
| C09D 4/00 | (2006.01) |
| C09D 101/00 | (2006.01) |
| C09D 201/00 | (2006.01) |

(52) U.S. Cl. .................. 106/401; 106/38.22; 106/38.25
(58) Field of Classification Search .................. 106/401, 106/38.25, 38.22, 106.401
See application file for complete search history.

(56) References Cited

U.S. PATENT DOCUMENTS

| | | | | |
|---|---|---|---|---|
| 3,415,692 A | * | 12/1968 | Armentano | 148/275 |
| 3,726,952 A | * | 4/1973 | Boden et al. | 264/48 |
| 4,028,120 A | * | 6/1977 | Emond | 106/38.24 |
| 4,719,036 A | * | 1/1988 | Clubley et al. | 252/391 |
| 4,885,136 A | * | 12/1989 | Katayama et al. | 422/15 |
| 4,892,585 A | * | 1/1990 | Fischer et al. | 106/38.22 |
| 4,895,703 A | * | 1/1990 | Zupanovich et al. | 422/14 |
| 4,980,128 A | * | 12/1990 | Cuisia et al. | 422/16 |
| 5,039,343 A | * | 8/1991 | Umeda et al. | 106/404 |
| 5,169,563 A | * | 12/1992 | Katayama et al. | 252/389.53 |
| 5,399,310 A | * | 3/1995 | Payne et al. | 264/338 |
| 5,864,596 A | * | 1/1999 | Egerbrecht et al. | 376/306 |
| 5,908,496 A | * | 6/1999 | Singule et al. | 106/271 |
| 5,942,058 A | * | 8/1999 | Sleeter et al. | 156/62.2 |
| 6,231,656 B1 | * | 5/2001 | Dekerf et al. | 106/38.25 |
| 6,402,990 B1 | * | 6/2002 | Marazzani et al. | 252/389.31 |
| 6,489,037 B1 | * | 12/2002 | Winterowd et al. | 428/511 |
| 6,607,694 B1 | * | 8/2003 | Blakemore et al. | 422/7 |
| 6,712,995 B2 | * | 3/2004 | Marazzani et al. | 252/389.31 |
| 2005/0156143 A1 | * | 7/2005 | Shimura et al. | 252/401 |

FOREIGN PATENT DOCUMENTS
GB        1 205 391      * 9/1970

* cited by examiner

*Primary Examiner* — Patricia L Hailey
(74) *Attorney, Agent, or Firm* — Millen, White, Zelano & Branigan, P.C.

(57) ABSTRACT

The invention provides an anti-corrosive package which can be added to release agents used in preparing textiles and molded articles from lignocellulosic materials, concrete and polyurethane foam.

55 Claims, 8 Drawing Sheets

Chart 1: Corrosion Study Cellulose Solutions TOFA Soap with & without Corrosion Package vs. Competitors; Temperature 23 degrees C, 35% Release Product + 65% Dilution Water

ANTI-CORROSIVE PACKAGE

RELATED APPLICATIONS

This application is a continuation-in-part of application Ser. No. 10/321,517, filed Dec. 18, 2002 now U.S. Pat. No. 7,018,461. Application Ser. No. 10/321,517 claims the benefit of U.S. provisional application Ser. No. 60/359,379 filed Feb. 26, 2002 and U.S. provisional application Ser. No. 60/358,378 filed Feb. 22, 2002.

FIELD OF THE INVENTION

The present invention relates to corrosion inhibitors.

BACKGROUND OF THE INVENTION

Release agents have been applied to equipment such as press platens used in molding/pressing lignocellulosic materials, casting concrete and molding polymer foams. The release agents are used to aid the removal of articles produced from manufacturing equipment. Examples of release agents include oils, wax, polishes, metallic salts, silicones and polytetrafluoroethylene. Many of the current release agents either contain EDTA or have EDTA added prior to their use to control specific water problems such as mineral deposits. However, the problem is that in these very high temperature environments, the addition of EDTA will exacerbate the already very corrosive atmosphere.

The following patents are representative of the art of release agents:
U.S. Pat. No. 4,257,995 issued to McLaughlin et al.;
U.S. Pat. No. 4,257,996 issued to Farrissey, Jr. et al. on Mar. 24, 1981;
U.S. Pat. No. 4,609,570 issued to Couleau et al. on Sep. 3, 1986;
U.S. Pat. No. 5,908,496 issued to Singule et al. on Jun. 1, 1999;
U.S. Pat. No. 5,194,584 issued to Leahy on Mar. 16, 1993;
U.S. Pat. No. 5,942,058, issued to Sleeter et al. on Aug. 24, 1999;
U.S. Pat. No. 6,132,503 issued to Singule et al. on Oct. 17, 2000;
U.S. Pat. No. 6,231,656 issued to Dekerf et al. on May 15, 2001;
EP 46014, and
EP 57502.

Release agents are especially useful in the engineered wood industry when molding lignocellulosic materials such as wood sheets, wood chips, wood fibers, wood flakes, wood strands, wood shavings, wood veneers, wood wool, cork, tree bark, sawdust, paper straw, flax, hulls, seeds, and nutshells. etc., into composite structures with adhesives. There may be added to these lignocellulosic materials other particulate or fibrous material in an amount of up to 25 wt %. These include mineral fillers, glass fibers, rubber, plastic fibers, or particles.

Examples of composite products comprised of lignocellulosic materials include: particle board, oriented strand board (OSB), plywood, chip board, medium density fiber board (MDF), hardboard, Agricultural board, and structural strand lumber.

An example of an OSB industry manufacturing process is as follows. Wood chips (wafers) are mixed with slurry of various waxes, thermosetting adhesives (such as phenolic resins and/or MDI) and other chemicals. This wood chip and slurry mixture is formatted into a continuous mat of various thicknesses (depending on the desired final 4×8 panel thickness). The web is sprayed with a release agent made up of various types of chemicals in an aqueous solution. This web is then cut into pieces, e.g., 24×8 Ft. pieces, or fed continuously into a press section where the web mat is pressed into boards or panels of desired thickness at pressures typically from 2 to 6 MPa and temperatures from 375 to 500 degrees Fahrenheit. The presses are made up of top and bottom platens, primarily mild steel that press the mat into the desired thickness under both heat and pressure which "cures" these thermosetting resin compounds. These techniques and conditions are modified as needed.

The engineered wood industry has been plagued with corrosive problems on the platens (in the press section) in preparing these products in that conventional processes create a highly corrosive atmosphere during manufacture. For example, the process described above can be very corrosive depending on the chemical attributes of the water, the water oxygen content, corrosive chemistries (such as carbonic acid, oxygen, and EDTA) introduced in the process, and the amount of oxygen released during the pressing process. When the web is subjected to this extreme heat and pressure, the dissolved oxygen is liberated from the water and it will attack the mild steel platens, commonly called "oxygen pitting" of the metal. This release of oxygen at high temperatures exacerbates corrosion by the presence of EDTA which is a component of all commercially available release agents at the time of the provisional filing of this patent.

Different types of chemical analysis can provide valuable information in corrosion monitoring programs. The measurement of pH, conductivity, dissolved oxygen, metallic and other ion concentrations, water alkalinity, concentration of suspended solids, inhibitor concentrations and scaling indices all fall within this domain. Several of these measurements can be made on-line using appropriate sensors. The corrosive nature of the water (or any fluid) can be predicted by using the generally accepted criteria found in models such as the "Ryznar" or "Langolier" indexes.

The Ryznar stability index (RSI) attempts to correlate an empirical database of scale thickness observed in municipal water systems to the water chemistry. Like the LSI, the RSI has its basis in the concept of saturation level. Ryznar attempted to quantify the relationship between calcium carbonate saturation state and scale formation. The Ryznar index takes the form:

$$RSI=2(pH_s)-pH$$

Where:
pH is the measured water pH
$pH_s$ is the pH at saturation in calcite or calcium carbonate.
The empirical correlation of the Ryznar stability index can be summarized as follows:
RSI<<6 the scale tendency increases as the index decreases
RSI>>the calcium carbonate formation probably does not lead to a protective corrosion inhibitor film
RSI>>8 mild steel corrosion becomes an increasing problem.

The actual corrosion rate of any given fluid on metal surfaces can be measured, quantified, and predicted by using the generally accepted methods of measuring weight loss on metal "coupons" over a specified period of time. These methods have been incorporated in a wide range of industries to quantify, compare, and predict the chemical and physical conditions of a process on metal equipment.

The terms below have the following meaning when used herein.

A "film formed by a metal passivator" is one produced by chemical action, with or without electrical assistance. The treatments change the immediate surface layer of metal into a film of metallic oxide or other compound which has better corrosion resistance than the natural oxide film and provides an effective base or key for supplementary protection such as paints. In some instances, these treatments can also be a preparatory step prior to painting.

An "inhibitor" is a chemical substance or combination of substances that, when present in the proper concentration and form in the environment prevents or reduces corrosion.

"Internal Oxidation" is the formation of isolated particles of corrosion products beneath the metal surface. This occurs as the result of preferential oxidation of certain alloy constituents by inward diffusion of oxygen, nitrogen, sulfur, etc.

"Chemical conversion Coating" is a protective or decorative nonmetallic coating produced in situ by chemical reaction of a metal with a chosen environment. It is often used to prepare the surface prior to the application of an organic coating.

"Reactive Metal" is a metal that readily combines with oxygen at elevated temperatures to form very stable oxides, for example, titanium, zirconium, and beryllium.

"Corrosion" is a chemical (often electrochemical) process that destroys structural materials. Typically it refers to corrosion of metals, but any other material (e.g., plastic or semiconductor) will also corrode. The simplest example of metallic corrosion is the rusting of iron in air. Iron is spontaneously oxidized by the oxygen in air to iron oxides (while the oxygen is being reduced). Metallic corrosion is very often an electrochemical process. It is always electrochemical when the metal is immersed in a solution, but even in atmospheric corrosion a thin film of condensed moisture often covers the surface. The metal in the corrosive solution essentially acts as a short-circuited galvanic cell. Different areas of the surface act as anode and cathode, at the anodic areas the metal is oxidized to an oxide while at the cathodic areas the dissolved oxygen is being reduced. The spontaneous complementary oxidation/reduction processes of "rusting" are spatially separated while an electrical current is flowing "internally" from one part of the corroding metal to another; the current is totally "wasted" as it produces no useful work but only generates heat. (A cell arrangement like this is often called a "local cell.") Corrosion products are typically oxides, but other products (e.g., sulfides) can also form depending on the environment. Corrosion always involves oxidation of the corroding material in the general sense of the term.

"Passivating inhibitors" (passivators) are compounds that cause a large anodic shift of the corrosion potential, forcing the metallic surface into the passivation range. There are two types of passivating inhibitors: Oxidizing anions, such as chromate, nitrite and nitrate that can passivate steel in the absence of oxygen and Non oxidizing ions such as phosphate, tungstate and molybdate that require the presence of oxygen to passivate steel. These inhibitors are the most effective and consequently the most widely used. Chromate based inhibitors are the least expensive inhibitors and were used until recently in a variety of applications, e.g. recirculation-cooling systems of internal combustion engines, rectifiers, refrigeration units, and cooling towers. Sodium chromate, typically in concentrations of 0.04-0.1% was used for these applications. At higher temperatures or in freshwater with chloride concentrations above 10 ppm higher concentrations are required. If necessary, sodium hydroxide is added to adjust the pH to a range of 7.5-9.5. If the concentration of chromate falls below a concentration of 0.016% corrosion will be accelerated. Therefore it is essential that periodic colorimetric analysis be conducted to prevent this from occurring. In general, passivation inhibitors can actually cause pitting and accelerate corrosion when concentrations fall below minimum limits. For this reason it is essential that monitoring of the inhibitor concentration be performed.

The simplest, and longest-established, method of estimating corrosion losses in plant and equipment is weight loss analysis. A weighed sample (coupon) of the metal or alloy under consideration is introduced into the process, and later removed after a reasonable time interval (usually 30, 60 or 90 days) The coupon is then cleaned of all corrosion products and is reweighed. The weight loss is converted to a total thickness loss, or average corrosion rate using proper conversion equations.

Weight loss determination has a number of attractive features that account for its sustained popularity. It is:

Simple: No sophisticated instrumentation is required to obtain a result.

Direct: A direct measurement is obtained, with no theoretical assumptions or approximations.

Versatile: It is applicable to all corrosive environments, and gives information on all forms of corrosion.

The choice of technique for initial preparation of the coupon surface, and for cleaning the coupon after use, is critical in obtaining useful data. Both the relevance and reproducibility of weight loss data are highly sensitive to the inherent suitability of these techniques, and to the care with which they are executed.

Surface finishing methods vary across a broad range for specific applications. Blasting with glass bead, sand, or other aggregate can provide an acceptable finish for some applications. Sanding with abrasive belts, or surface or double disc grinding with abrasive stones also provides an excellent surface for evaluation. Cleaning of specimens before weighing and exposure is critical to remove any contaminants that could affect test results. NACE Recommended Practice RP-0775 and ASTM G-1 G-4 are incorporated herein by reference for further detail on surface finishing and cleaning of weight-loss coupons.

DESCRIPTION OF THE INVENTION

The present invention is directed an anti-corrosive package comprised of two or more, preferably at least three, and most preferably four anti-corrosive functional classes of corrosion chemistries used in high temperature atmospheres. Examples of high temperature atmospheres are found in the manufacture of engineered wood such as oriented strand board (OSB), particle board, plywood, chip board, medium density fiberboard (MDF), hard board, structural strand lumber, agricultural board and any other composite product comprised of lignocellulosic material.

The anti-corrosive package can be added to release agents to provide anti-corrosive properties not present in any conventional release agent used in molding lignocellulosic materials, casting concrete and molding polymer foams. The anti-corrosive package greatly reduces the corrosiveness of these release agents, as well as other chemistries in these processes, on the steel platens. They are particularly useful where high temperature atmospheres are utilized in manufacturing oriented strand board (OSB), plywood, particle board, chipboard, medium density fiberboard (MDF), hard board, structural strand lumber, agricultural board or any composite board product produced from lignocellulosic material. Therefore, the present invention also provides an anti-corrosive package in combination with a release agent. Alternatively, the anti-corrosive package can be formulated to be applied directly to mold surfaces or separately treat mill water that is used for dilution of the release agent. In either case, it is important to use amounts that will counter the corrosive atmosphere developed (by dissolved oxygen and other combinations of chemistries) in the presses during these elevated temperatures.

The anti-corrosive package may comprise separate containers for each of the two more anti-corrosive agents or they may be combined in one container. The separate agents may be premixed prior to use or added individually to the release agent or dilution water.

The anti-corrosive package of this invention comprises a combination of compounds that attack several corrosive conditions or factors which contribute to corrosion. These corrosive conditions and/or contributing factors may be present from the chemicals involved in the process of manufacturing the engineered boards be they OSB, particle board, agricultural board or plywood, etc. It is contemplated that this anti-corrosive package will find use in any board manufactured in the same manner, even if made of new materials replacing lignocellulosic materials such as wood or vegetation fiber.

An anti-corrosive package of this invention generally provides the following chemistries:

A) An oxygen scavenger that binds dissolved oxygen within the aqueous carrier and binds the oxygen liberated during the pressing process at elevated temperatures to prevent oxygen pitting of metal. An example of a preferred oxygen scavenger which binds oxygen is diethyl hydroxylamine (DEHA). DEHA (diethylhydroxylamine) is a volatile oxygen scavenger and mild steel corrosion inhibitor. DEHA also "reduces" rust to magnetite, which is a much less oxidizable form of iron. The amount used preferably falls within the range of 0.0001 wt % and 0.001 wt %, based on the total weight of the release agent but also an amount that will scavenge the percent of dissolved oxygen present in the dilution water and mill water used during the pressing cycle.
And one or more of the following:

B) A metal "passivator" that forms a film to coat steel. A metal "passivator" as used herein, puts the metal surface into a lower state of corrosivity. The two types of metal "passivators" are: 1. Oxidizing anions such as Chromate, nitrite, and nitrate; and 2. Non oxidizing ions such as phosphate, tungstate and molybdate that require the presence of oxygen to passivate steel. Diethylhydroxylamine also acts as a metal passivator. The amount used preferably is sufficient to passivate the condition, which can fall within the range of 0.0001 wt % to 0.0003 wt % based on the total weight of the release agent.
And/or C) A carbonic acid neutralizer which is preferably at least one organo-amino (and preferably also "passivates" metal), such as cyclohexylamine, and/or morpholine, and/or N,N diethylethanolamine (dimethylaminoethanol). The amount used is preferably at levels to counter the corrosive atmosphere of the specific condition which can fall within the range of 0.0002 wt % to 0.0011 wt. % based on the weight of the release agent. Preferably, three or more neutralizing organo-amines are used. A preferred combination is cyclohexylamine, morpholine and N,N-diethylethanolamine. Each amine has its own vapor to liquid distribution (equilibrium) ratio to neutralize carbonic acid under varying conditions during pressing. Higher or lower amounts of these three components can be used.
And/or D) A film forming corrosion inhibitor which is preferably a dialkylamide derived from an amine of the formula $RR^1NH$ wherein R and $R^1$ are independently $C_{1-4}$ alkyl. Dimethylamide is preferred. Its function is to form a mono-molecular, non-wettable corrosion barrier film on the mild steel.

An example of a specific anti-corrosive package of this invention is comprised of:

A) diethylhydroxylamine (DEHA), (CAS 3710-84-7), which functions as an oxygen scavenger that binds dissolved oxygen and as a metal "passivator" by causing a large anodic shift of the corrosion potential, forcing the metallic surface into a passivation range, (When used in mixtures, it is preferably used in an amount of 5-20 wt %, based on the weight of the total anti-corrosive package.);

B) a combination of cyclohexylamine (CAS 108-91-8), morpholine ((CAS 110-91-8) and N,N-diethylethanolamine (CAS 100-37-8) used to neutralize carbonic acid, (The amount used is preferably 15-35 wt % each, based on the weight of the total anti-corrosive package. Other organo-amines can be used to neutralize carbonic acid and the amount used can fall outside this preferred range; however, this combination and range are preferred.);
And C) dimethylamide is used as a film forming corrosion inhibitor to form a mono-molecular, non-wettable corrosion barrier film on the mild steel, (Preferably, dimethylamide is used in an amount of 5-30% by weight, based on the weight of the total anti-corrosive package.).

Other examples of oxygen scavengers other than DEHA, are sulfites, $C_1$-$C_6$ alkyl/aryl hydrazines, tannins and carbohydrazide.

The anti-corrosive package within release agents has performed with consistent results, reducing the corrosive conditions to very low or no corrosion on platens whereas when compared to other systems, much higher corrosion rates result and corrosion results vary between tests.

Although the elevated temperatures (about 375° F.) found in the pressing processes of OSB, plywood, particle board, etc., exacerbate the amount of corrosion rates, the corrosion rates of release formulations with the anti-corrosive package of this invention remain under (less than) 1.0 mils per year. Corrosion rates of conventional release formulations without the anti-corrosive package at temperatures above 375 degrees Fahrenheit can increase exponentially to >1200 mils per year.

The present invention includes the concept of combining a release agent with an anti-corrosive package as described above. The amount of the anti-corrosive package used preferably falls within the range of 0.05 wt % and 0.3 wt %, based on total weight of the release agent. The composition of the mixture and the amount used depends on the needs of the end user and the particular corrosive atmosphere at the specific mill.

The release agents suitable for use in the combined formulations of the present invention are conventional mold release agents, preferably, those well suited for molding lignocellulosic materials, pre-cast concrete, and polyurethane foam in automobile and marine manufacturing. Examples include release agents based on soap, silicone, oil and/or wax. The anti-corrosive package comprises at least two of the following components, but preferably comprises all four listed below.

1. Oxygen scavenger
2. Metal passivator
3. Carbonic acid neutralizer
4. Film forming corrosion inhibitor The anti-corrosive packages defined above are preferred. These can be added when the release formulation is synthesized or in the process dilution water just before mixing with the release agent.

The combination of anti-corrosive package and release agent can essentially be used on any equipment wherein these materials are handled and processed, such as open or closed molds, including press molds which employ press platens or two piece continuous molds which are pressed together. These molds can be made of metal, concrete or wood.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Figure 1:
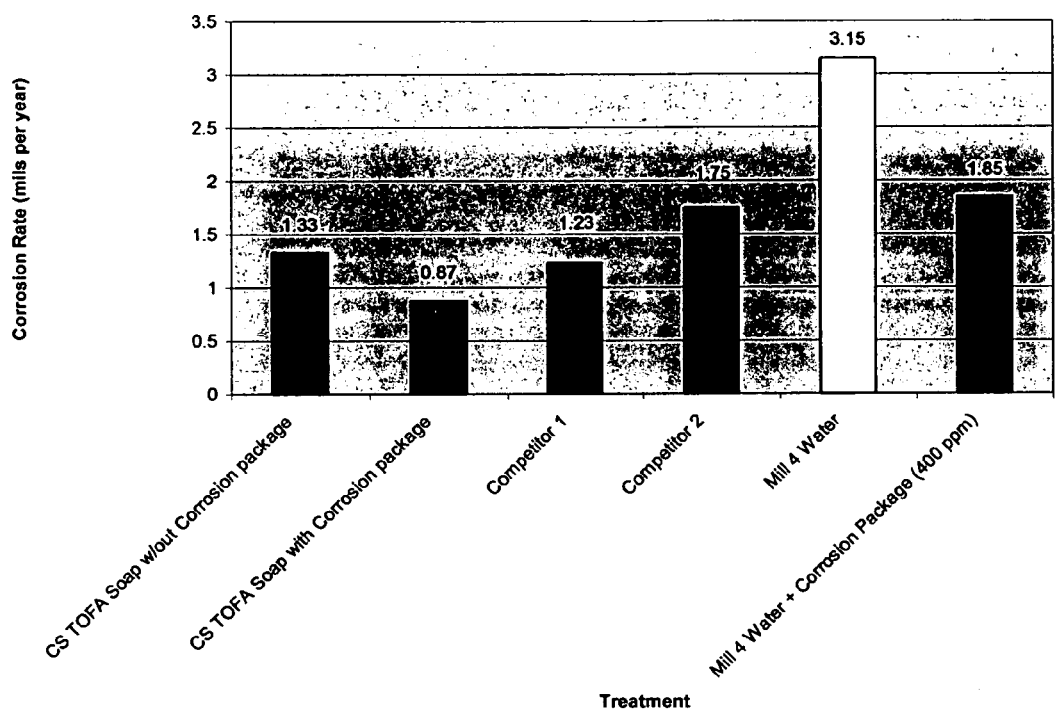
FIG. 1 is a bar graph illustrating corrosion rates per year with various release agents at 23° C. (35% Release Product+65% Dilution Water)
Figure 2:
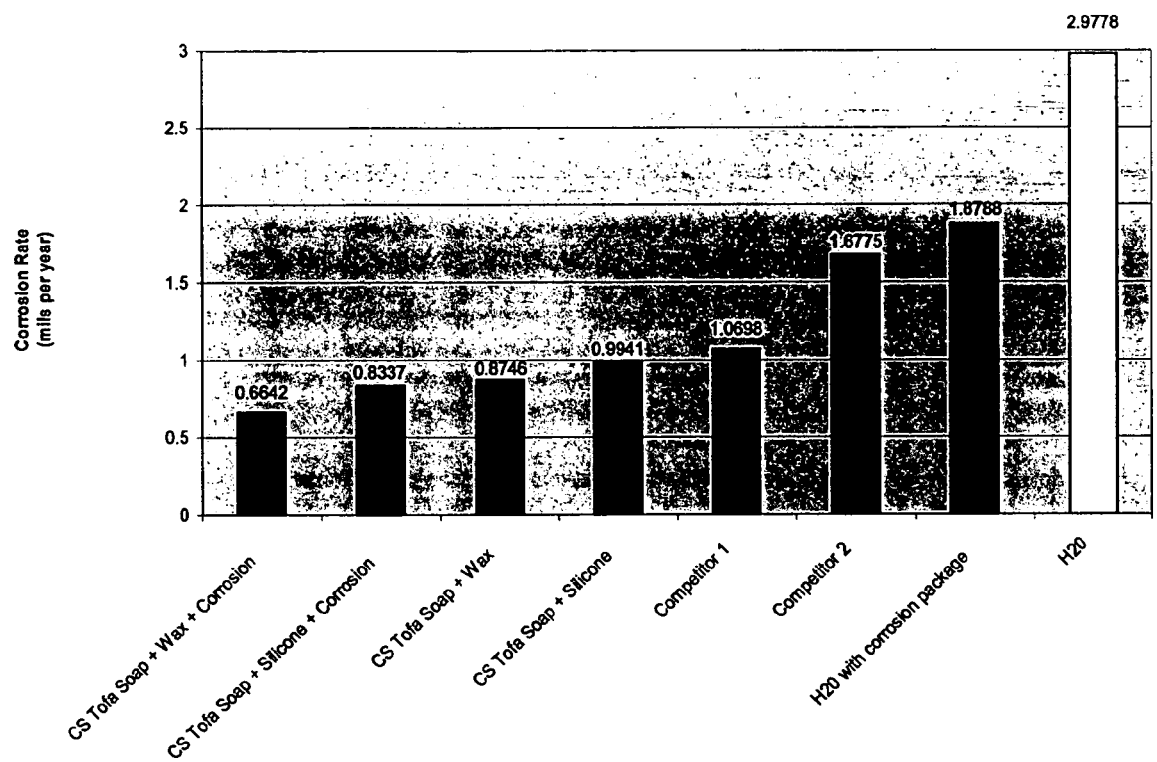
FIG. 2 is a bar graph illustrating corrosion rates per year with various release agents at 23° C. and Mill 1 Local Dilution Water, (35% Release Agent+65% Dilution Water)
Figure 3:
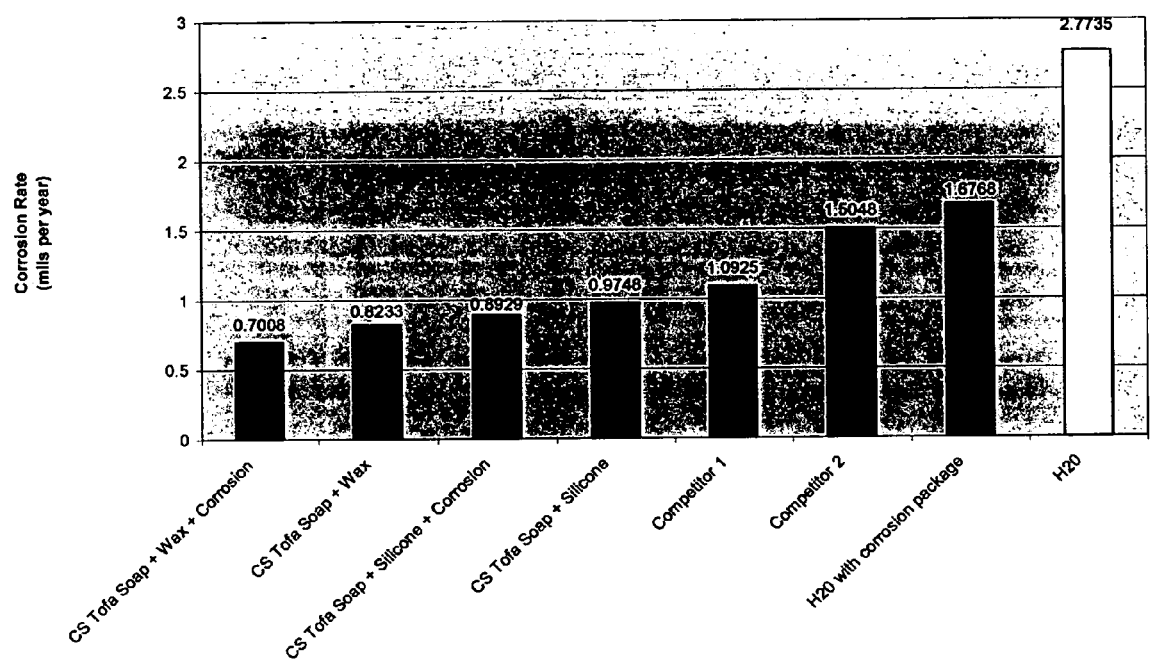
FIG. 3 is a bar graph illustrating corrosion rates per year with various release agents at 23° C. and Mill 2 Local Dilution Water, (35% Release Agent+65% Dilution Water)
Figure 4:
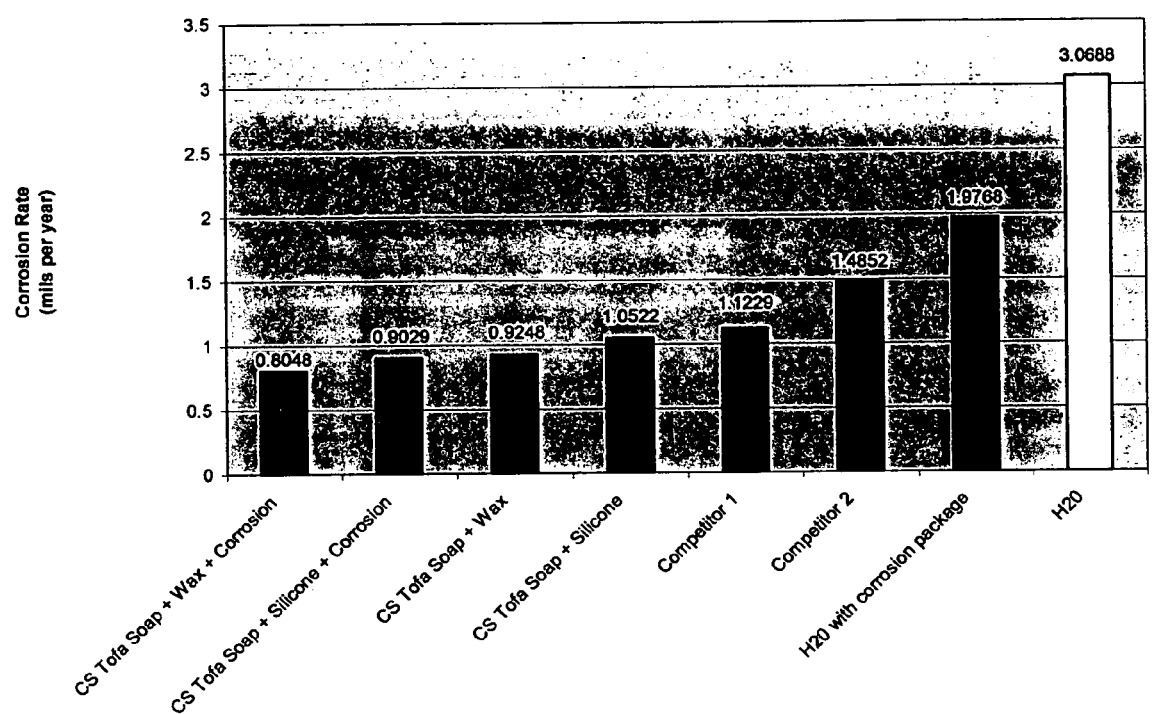
FIG. 4 is a bar graph illustrating corrosion rates per year with various release agents at 23° C. and Mill 3 Local Dilution Water, (35% Release Agent+65% Dilution Water)
Figure 5:
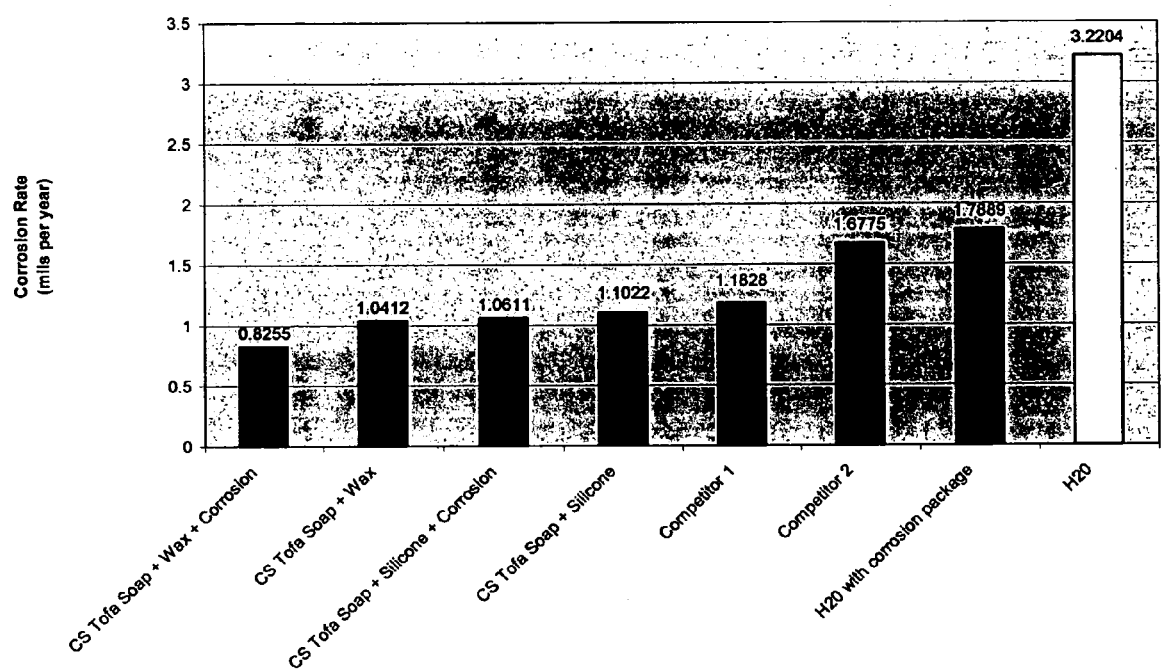
FIG. 5 is a bar graph illustrating corrosion rates per year with various release agents at 23° C. and Mill 4 Local Dilution Water, (35% Release Agent+65% Water Dilution)

Table 1 and FIG. 1 are the data and a bar graph, respectively, illustrating the results of a corrosion study performed at 23 degrees Celsius. The study compares: 1,2) Cellulose Solutions TOFA soap with and without a corrosion package, 3,4) the TOFA soaps of Competitor 1 and Competitor 2, and 5,6) the process dilution water for a particular commercial manufacturing location with and without Cellulose Solutions' corrosion package. The study was completed on Jul. 29, 2002.

Table 2, FIGS. 2, 3, 4, and 5 is the data and bar graphs, respectively, illustrating the results of a corrosion study performed at 23 degrees Celsius. The study compares:
1,2) Cellulose Solutions' TOFA soap plus wax with and without the corrosion package,
3,4) Cellulose Solutions' TOFA soap plus a silicone compound with and without the corrosion package,
5,6) the TOFA soaps of Competitor 1 and Competitor 2, and
7,8) the process dilution water of four particular commercial manufacturing locations with and without Cellulose Solutions' corrosion package. The study was completed Oct. 30, 2002.

Figure 6:
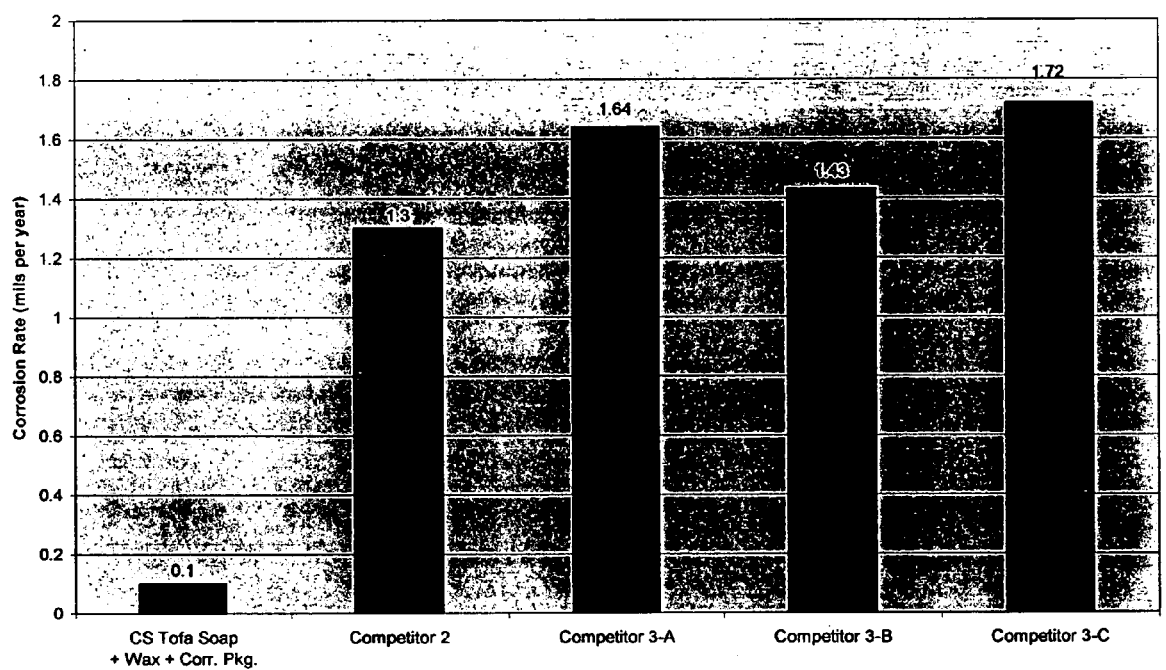
FIG. 6 is a bar graph illustrating corrosion rates per year with various release agents at 80° C. (33% Release+67% Dilution Water)

Table 3, FIG. 6 is the data and bar graph, respectively, illustrating the results of a corrosion study performed at 80 degrees Celsius, by a Commercial Wood Products Manufacturer. The study compares:
1) Cellulose Solutions' TOFA soap plus a wax compound with the corrosion package,
2) TOFA soap of Competitor 2, and
3,4,5) three release products from Competitor 3 (A-C). The study was completed by June, 2003.

Figure 7:
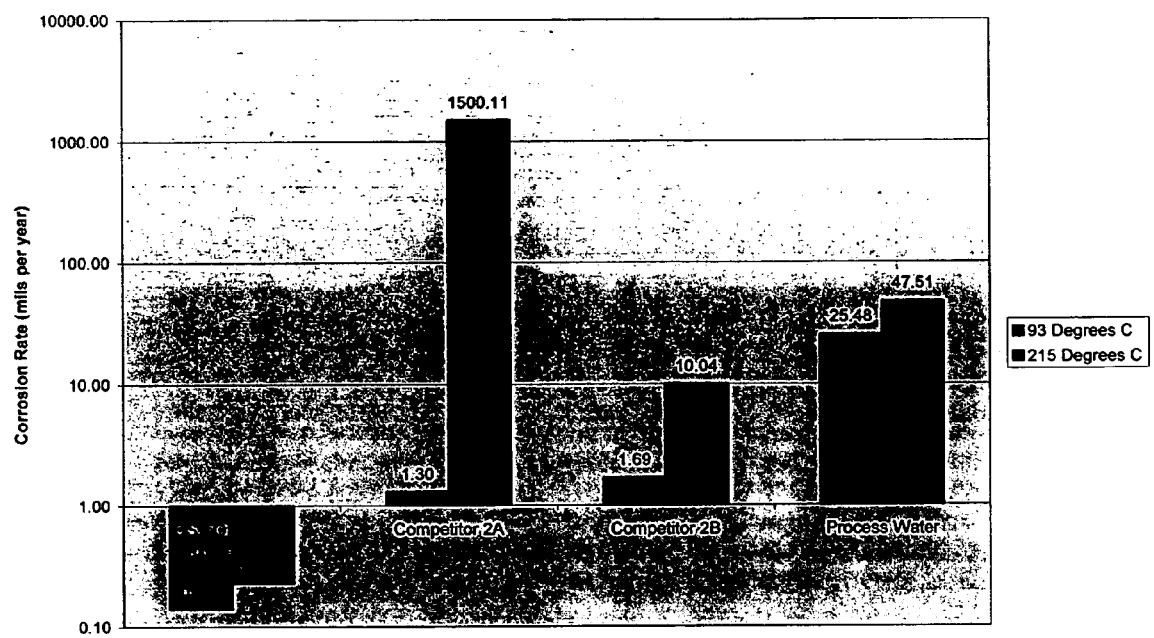
FIG. 7 is a bar graph illustrating corrosion rates per year with various release agents at 93° C., (light Color) and 215° C., (dark color)

Table 4, FIG. 7 is the data and bar graph, respectively, illustrating the results of a corrosion study performed at 93 degrees and 215 degrees Celsius, by a Commercial Wood Products Manufacturer. The study compares:
1) Cellulose Solutions' TOFA soap plus a wax compound with the corrosion package,
2,3) two release products from a Competitor 2, and 4) the process dilution water from a particular commercial manufacturing location.

Figure 8:
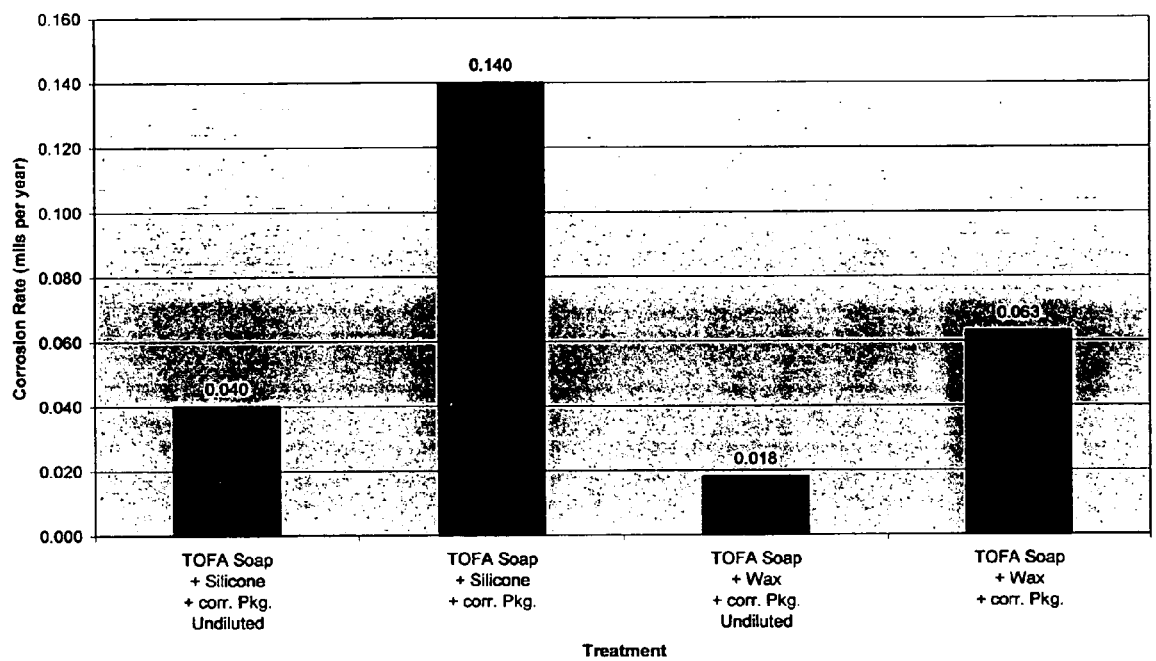
FIG. 8 is a bar graph illustrating corrosion rates per year with various release agents at 24° C.

Table 5, FIG. 8 is the data and bar graph, respectively, illustrating the results of a corrosion study performed at 24 degrees Celsius. The study compares: 1) Cellulose Solutions' TOFA soap plus silicone compound with the corrosion package, undiluted and diluted with process water,
2) Cellulose Solutions' TOFA soap plus wax with the corrosion package, undiluted and diluted with process water.

In the foregoing and in the following examples, all temperatures are set forth uncorrected in degrees Celsius and, all parts and percentages are by weight, unless otherwise indicated.

EXPERIMENTAL

Example 1

A release agent for use in the combination formulations of the present invention is synthesized with the following components and properties:
The anti-corrosive package added to the release agent comprises 0.05 to 0.30 wt %, (target 0.1 wt %), based on the weight of the release agent, of a mixture of the following anti-corrosion agents:
  dimethyl amide, (5-30 wt %, based on the weight of the anti-corrosive package);
  morpholine (CAS 110-91-8), (5-15 wt %, based on the total weight of the anti-corrosive package);
  diethylaminoethanol (CAS 100-37-8), (5-15 wt %, based on the total weight of the anti-corrosive package);
  cyclohexylamine, (CAS 108-91-8), (10-20 wt %, based on the total weight of the anti-corrosive package);
  DEHA, diethylhyroxyamine (CAS 3710-84-7), (10-20 wt %, based on the total weight of the anti-corrosive package).

The amount of anti-corrosive package and the amount of the above components within the anti-corrosive package is dependent on the needs of a particular mill.

Example 2

A release agent for use in the combination formulations of the present invention is synthesized with the following components and properties:
  Tall oil fatty acids=15.0-16.4 wt %, (target=15.75 wt %);
  KOH (45% solids)=5.8 to 7.3 wt %, (target 6.46 wt %);
  Synthetic wax$^a$=0.75-3.0 wt %, (target 2.0 wt %)
  water=74.7 to 76.7 wt % (target 75.69 wt %);
  corrosion package$^b$ (50% solids)=0.1 to 0.3 wt %, (target 0.1 wt %);
  total solids=18 to 23 wt % (target 21% or higher);
  pH=10.5 to 11.2 (target 10.8);
The anti-corrosive package added to the release agent comprises 0.1 to 0.3 wt %, (target 0.1 wt %), based on the weight of the release agent, of a mixture of the following anti-corrosion agents:
  dimethylamide, (5-30 wt %, based on the total weight of the anti-corrosive package);
  morpholine (CAS 110-91-8), (5-15 wt %, based on the total weight of the anti-corrosive package);

diethylaminoethanol (CAS 100-37-8), (5-15 wt %, based on the total weight of the anti-corrosive package);

cyclohexylamine, (CAS 108-91-8), (10-20 wt %, based on the total weight of the anti-corrosive package);

DEHA, diethylhyroxyamine (CAS 3710-84-7), (10-20 wt %, based on the total weight of the anti-corrosive package).

The amount of anti-corrosive package and the proportion of components within the mixture is dependent on the needs of a particular mill.

Example 3

A release agent for use in the combination formulations of the present invention is synthesized with the following components and properties:

Tall oil fatty acids=15.0-16.4 wt %, (target=15.75 wt %);
KOH (45% solids)=5.8 to 7.3 wt %, (target 6.46 wt %);
Silicone (Dimethyl cyclosiloxanes)=0.5 to 4.5 wt %;
water=74.7 to 76.7 wt % (target 75.69 wt %);
package$^d$ (50% solids)=0.1 to 0.3 wt %, (target 0.1 wt %);

$^d$ The anti-corrosive package added to the release agent comprises 0.1 to 0.3 wt %, (target 0.1 wt %), based on the weight of the release agent, of a mixture of the following anti-corrosion agents:

dimethylamide, (5-20 wt %, based on the total weight of the anti-corrosive package);

morpholine (CAS 110-91-8), (5-15 wt %, based on the total weight of the anti-corrosive package);

diethylaminoethanol (CAS 100-37-8), (5-15 wt %, based on the total weight of the anti-corrosive package);

cyclohexylamine, (CAS 108-91-8), (10-20 wt %, based on the total weight of the anti-corrosive package);

DEHA, diethylhydroxyamine (CAS 3710-84-7), (10-20 wt %, based on the total weight of the anti-corrosive).

total solids=18 to 23 wt % (target 21% or higher);
pH=10.5 to 11.2 (target 10.8);

The amount of anti-corrosive package and the proportion of components within the mixture is dependent on the needs of a particular mill.

Release agents with an anti-corrosive package as described above compared to competitive release agents were applied to samples of a platen (corrosion coupons) used in commercial press processes. A corrosion coupon test at temperatures of 23° C., 24° C., 80° Celsius, 90° C., and 215° C. were performed and the test results are provided in tables 1-5 below and illustrated in FIGS. 1-8. This superior performance is especially evident in Table 3 and Table 4, FIG. 6 and FIG. 7 where the temperatures are elevated to 80° C. and 215° C. (215° C. duplicates actual chemical interactions occurring in actual commercial manufacturing conditions).

Tables 1-5[1] Corrosion Aides with Various/Additives/Corrosion Packages

TABLE 1

Corrosion Rate of Cellulose Solutions' TOFA Soap with and without Corrosion Package vs. Competitors 1 & 2; Temperature 23 degrees C., 35% Release 65% Release Corrosion Study: Independent laboratory
Dilution Water Source: Mill 4 & Mill 1
Coupon Alloy: C1010
Alloy Type: Mild Steel
Date of Study: Jul. 29, 2002
Date In: Jun. 29, 2002
Date Out: Jul. 29, 2002
Total Days In: 30 days
Dilution Factor: 35% Release + 65% Water
Temperature: Ambient (23 degrees C.)

| Mill 4 Dilution Water | |
|---|---|
| Treatment | Corrosion Rate |
| CS TOFA Soap w/out Corrosion package | 1.33 |
| CS TOFA Soap with Corrosion package | 0.87 |
| Competitor 1 | 1.23 |
| Competitor 2 | 1.75 |
| Mill 4 Water | 3.15 |
| Mill 4 Water + Corrosion Package (400 ppm) | 1.85 |

TABLE 2

Corrosion Rate of Cellulose Solutions' Release Agents with and without Corrosion Package with Various Additives vs. Competitive Release Agents and Diluton Water from Four Particular Manufacturing Sites with and without Corrosion Package

| Mill 1 | | Mill 2 | | Mill 3 | | Mill 4 | |
|---|---|---|---|---|---|---|---|
| Treatment | MPY | Treatment | MPY | Treatment | MPY | Treatment | MPY |
| CS Tofa Soap + Wax + Corrosion | 0.6642 | CS Tofa Soap + Wax + Corrosion | 0.7008 | CS Tofa Soap + Wax + Corrosion | 0.8048 | CS Tofa Soap + Wax + Corrosion | 0.8255 |
| CS Tofa Soap + Silicone + Corrosion | 0.8337 | CS Tofa Soap + Wax | 0.8233 | CS Tofa Soap + Silicone + Corrosion | 0.9029 | CS Tofa Soap + Wax | 1.0412 |
| CS Tofa Soap + Wax | 0.8746 | CS Tofa Soap + Silicone + Corrosion | 0.8929 | CS Tofa Soap + Wax | 0.9248 | CS Tofa Soap + Silicone + Corrosion | 1.0611 |
| CS Tofa Soap + Silicone | 0.9941 | CS Tofa Soap + Silicone | 0.9748 | CS Tofa Soap + Silicone | 1.0522 | CS Tofa Soap + Silicone | 1.1022 |
| Competitor 1 | 1.0698 | Competitor 1 | 1.0925 | Competitor 1 | 1.1229 | Competitor 1 | 1.1828 |
| Competitor 2 | 1.6775 | Competitor 2 | 1.5048 | Competitor 2 | 1.4852 | Competitor 2 | 1.6775 |
| H20 with corrosion package | 1.8788 | H20 with corrosion package | 1.6768 | H20 with corrosion package | 1.9768 | H20 with corrosion package | 1.7889 |
| H20 | 2.9778 | H20 | 2.7735 | H20 | 3.0688 | H20 | 3.2204 |

TABLE 3

Corrosion Rate of Cellulose Solutions' Release Agents with Corrosion Package with Wax Additives vs. Competitive Release; Temperature 80 Degrees Celsius Corrosion Study:
Major Oriented
Strand Board
Manufacturer
Study Conclusion Jun. 03, 2003
Dilution Water: Same source for all treatments
Coupon Alloy: A36 carbon steel
Alloy Type: Mild steel
Total Days: 30 days
Dilution Factor: 33% Release + 67% Water
Temperature: 80 degrees C.

| Treatment | Corrosion Rate |
|---|---|
| CS Tofa Soap + Wax + Corr. Pkg. | 0.1 |
| Competitor 2 | 1.3 |
| Competitor 3-A | 1.64 |
| Competitor 3-B | 1.43 |
| Competitor 3-C | 1.72 |

TABLE 4

Corrosion Rate of Cellulose Solutions' Release Agents with Corrosion Package with Wax Additives vs. Competitive Release; Temperature 215 Degrees Celsius Corrosion Study: Major Oriented Strand Board Manufacturer
Dilution Water Source: Process Water for all treatments (>330 hardness)
Coupon Alloy Type: Mild Steel
Date of Study: December 2003
Dilution Factor: 5% Release + 95% Process Water
Temperature: 93 degrees C and 215 degrees C.

| | Corrosion Rate (mils per year) | |
|---|---|---|
| Treatment | 93 Degrees C. | 215 Degrees C. |
| CS TOFA soap + wax + corr. Pkg. | 0.14 | 0.23 |
| Competitor 2A | 1.30 | 1500.11 |
| Competitor 2B | 1.69 | 10.04 |
| Process Water | 25.48 | 47.51 |

TABLE 5

Corrosion Rate of Cellulose Solutions' Release Soap plus Wax Additive plus Corrosion Package vs. Cellulose Solutions Soap plus Silicone Additive plus Corrosion Package; Temperature 24 C.

Corrosion Study: Independent Laboratory
Dilution Water: Same water for all treatments
Coupon Alloy: C1010
Alloy Type: Mild Steel
Date of Study: Feb. 6, 2004
Date In: Jan. 6, 2004
Date Out: Feb. 6, 2004
Total Days: 31 days
Dilution Factor: Undiluted Product and 33% Relase + 67% Water
Temperature: Ambient (24 degrees C.)

| Treatment | Corrosion Rate (mils per year) |
|---|---|
| TOFA Soap + Silicone + corr. Pkg. Undiluted | 0.040 |
| TOFA Soap + Silicone + corr. Pkg. | 0.140 |
| TOFA Soap + Wax + corr. Pkg. Undiluted | 0.018 |
| TOFA Soap + Wax + corr. Pkg. | 0.063 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding application Ser. No. 10/321,517, filed Dec. 18, 2002 incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A mixture comprising an anti-corrosive package and a release agent which provides release properties to lignocellulosic materials on metal for the manufacture of oriented strand board, said anti-corrosive package comprising two or more of the following anti-corrosive agents:
   A) at least one metal passivator that forms a protective film on steel; and/or
   B) at least one carbonic acid neutralizer which is an organo amine, and/or
   C) at least one film forming corrosion inhibitor, and/or
   D) at least one oxygen scavenger that binds dissolved oxygen within an aqueous carrier.

2. A mixture as in claim 1, wherein said oxygen scavenger that binds dissolved oxygen within an aqueous carrier is diethylhydroxylamine, a sulfite, an alkyl or aryl hydrazine, a tannin, a carbohydrazide or a mixture thereof.

3. A mixture as in claim 2, wherein diethylhydroxylamine is both said oxygen scavenger that binds dissolved oxygen within an aqueous carrier and said metal passivator and said release agent contains at least one additional anti-corrosive agent of B), C) or D).

4. A mixture as in claim 3 wherein said diethylhydroxylamine is used in an amount of 10-20 wt %, based on the total weight of the anti-corrosive package.

5. A mixture as in claim 1, wherein the metal passivator, is selected from the group consisting of chromate, nitrite, nitrate, phosphate, tungstate and molybdate.

6. A mixture as in claim 5 wherein said metal passivator is used in an amount that preferably falls within the range of 5%-20% based on the total weight of the anti-corrosive package.

7. A mixture as in claim 1, wherein the one or more organo-amines that neutralize carbonic acid within an aqueous carrier is morpholine, diethylaminoethanol, cyclohexylamine, or a combination thereof.

8. A mixture as in claim 7, wherein a combination of organo-amines comprising morpholine, diethylaminoethanol and cyclohexylamine is used as the neutralizer for carbonic acid.

9. A mixture as in claim 8, wherein said combination of organo-amines used as the neutralizer for carbonic acid is used in an amount of 5-20 wt % each, based on the weight of the anti-corrosive package.

10. A method of using the mixture of claim 1, comprising applying said mixture to the surface of a mold or platen.

11. A mixture as in claim 1 wherein
diethylhydroxylamine is used as an oxygen scavenger in an amount of 10-20 wt %, based on the total weight of the anti-corrosive package;
the film forming corrosion inhibitor is used in an amount of 8-20 wt %, based on the total weight of the anti-corrosive package;
morpholine, diethylaminoethanol, cyclohexylamine, or a combination thereof is used as the neutralizer for carbonic acid in an amount of 5-20 wt % each, based on the weight of the anti-corrosive package and
optionally, chromate, nitrite, nitrate, phosphate, tungstate or molybdate is used as a metal passivator in an amount that falls within the range of 5%-20%, based on the total weight of the anti-corrosive package.

12. A mixture as in claim 1 which contains an additional additive selected from preservatives, biocides, anti-foaming agents, surfactants and flame retardants.

13. A mixture as in claim 1, which provides release properties to lignocellulosic materials on metal at levels from 0.1-1.0 milligrams of solids/cm$^2$ of surface area.

14. A mixture as in claim 1 wherein the release agent comprises:
a) an alkali metal salt of a tall oil fatty acid, a silicone or a combination thereof and
b) an additional wax or oil.

15. A mixture as in claim 14, wherein said alkali metal salt of a tall oil fatty acid is a potassium salt.

16. A mixture as in claim 14, wherein the wax is polyethylene glycol or ethylene bisstearamide.

17. A mixture as in claim 14, wherein the wax is a natural wax.

18. A mixture as in claim 14, which contains an additional additive to enhance the release properties selected from polishes and polytetrafluoroethylene.

19. A mixture as in claim 14, wherein the oil is a vegetable oil.

20. A mixture as in claim 14, wherein the vegetable oil is castor oil.

21. A mixture as in claim 1, wherein the release agent is a silicone.

22. A mixture comprising an anti-corrosive package and a release agent that provides release properties to lignocellulosic materials on metal, said anti-corrosive package comprising the following anti-corrosive agents:
A) at least one metal passivator that forms a protective film on steel; and
B) at least one carbonic acid neutralizer which is an organo amine, and
C) at least one oxygen scavenger that binds dissolved oxygen within an aqueous carrier.

23. A mixture as in claim 22 wherein the anti-corrosive package additionally comprises at least one film forming corrosion inhibitor.

24. A mixture comprising an anti-corrosive package and a release agent which provides release properties to lignocellulosic materials on metal, wherein said anti-corrosive package comprises at least one oxygen scavenger that binds dissolved oxygen within an aqueous carrier:
A) at least one metal passivator that forms a protective film on steel and/or
B) at least one carbonic acid neutralizer which is an organo amine;
said release agent comprising an alkali metal salt of a tall oil fatty acid, a silicone or a combination thereof.

25. A mixture as in claim 24, which contains an additional additive, selected from preservatives, biocides, anti-foaming agents, surfactants and flame retardants.

26. A mixture as in claim 24, wherein said at least one oxygen scavenger(s) that bind dissolved oxygen within an aqueous carrier is diethylhydroxylamine, a sulfite, a hydrazine, a tannin, carbohydrazide or a mixture thereof.

27. A mixture as in claim 24, wherein said at least one oxygen scavenger(s) that bind dissolved oxygen within an aqueous carrier is diethylhydroxylamine.

28. A mixture as in claim 24, which provides release properties to lignocellulosic materials on metal at levels from 0.1-1.0 milligrams of solids/cm$^2$ of surface area.

29. A mixture as in claim 24 wherein the release agent comprises an additional wax or oil.

30. A mixture as in claim 29, wherein said alkali metal salt of a tall oil fatty acid is a potassium salt.

31. A mixture as in claim 29, wherein the wax is polyethylene glycol or ethylene bisstearamide.

32. A mixture as in claim 29, wherein the wax is a natural wax.

33. A mixture as in claim 29, which contains an additional additive to enhance the release properties selected from the group consisting of polishes, and polytetrafluoroethylene.

34. A mixture as in claim 29, wherein the oil is a vegetable oil.

35. A release agent as in claim 34, wherein the vegetable oil is castor oil.

36. A mixture as in claim 29, which contains an additional additive selected from preservatives, biocides, anti-foaming agents, surfactants and flame retardants.

37. A method of using the mixture of claim 24, comprising applying said mixture to the surface of a mold or platen.

38. A mixture as in claim 24 wherein the anti-corrosive package additionally comprises at least one film forming corrosion inhibitor.

39. A mixture as in claim 24 wherein the anti-corrosive package consists of at least one oxygen scavenger that binds dissolved oxygen within an aqueous carrier and at least one metal passivator that forms a protective film on steel.

40. A mixture as in claim 24 wherein the anti-corrosive package consists of at least one oxygen scavenger that binds dissolved oxygen within an aqueous carrier and at least one carbonic acid neutralizer which is an organo amine.

41. A mixture as in claim 24 wherein the anti-corrosive package consists of at least one oxygen scavenger that binds dissolved oxygen within an aqueous carrier, at least one metal passivator that forms a protective film on steel and at least one carbonic acid neutralizer that is an organo amine.

42. A mixture as in claim 24 wherein
diethylhydroxylamine is used as an oxygen scavenger in an amount of 10-20 wt %, based on the total weight of the anti-corrosive package;

morpholine, diethylaminoethanol, cyclohexylamine, or a combination thereof is used as the neutralizer for carbonic acid in an amount of 5-20 wt % each, based on the weight of the anti-corrosive package and optionally, chromate, nitrite, nitrate, phosphate, tungstate or molybdate is used as a metal passivator in an amount that falls within the range of 5%-20%, based on the total weight of the anti-corrosive package.

43. A mixture comprising an anti-corrosive package and a release agent which provides release properties to lignocellulosic materials on metal for the manufacture of oriented strand board, wherein said anti-corrosive package comprises at least one oxygen scavenger that binds dissolved oxygen within an aqueous carrier and
   A) at least one metal passivator that forms a protective film on steel and
   B) at least one carbonic acid neutralizer which is an organo amine;
   said release agent comprising an alkali metal salt of a tall oil fatty acid, a silicone or a combination thereof.

44. A mixture as in claim 43 wherein the anti-corrosive package additionally comprises at least one film forming corrosion inhibitor.

45. A mixture comprising an anti-corrosive package and a release agent which provides release properties to lignocellulosic materials on metal, said anti-corrosive package comprising two or more of the following anti-corrosive agents:
   A) at least one metal passivator that forms a protective film on steel; and/or
   B) at least one carbonic acid neutralizer which is an organo amine, and/or
   C) at least one oxygen scavenger that binds dissolved oxygen within an aqueous carrier.

46. A mixture as in claim 45 wherein the anti-corrosive package consists of at least one metal passivator that forms a protective film on steel; at least one carbonic acid neutralizer which is an organo amine, and at least one oxygen scavenger that binds dissolved oxygen within an aqueous carrier.

47. A mixture as in claim 45 wherein the anti-corrosive package consists of at least one metal passivator that forms a protective film on steel and at least one carbonic acid neutralizer which is an organo amine.

48. A mixture as in claim 45 wherein the anti-corrosive agents consist of at least one metal passivator that forms a protective film on steel; and at least one oxygen scavenger that binds dissolved oxygen within an aqueous carrier.

49. A mixture as in claim 45 wherein the anti-corrosive agents consist of at least one carbonic acid neutralizer that is an organo amine, and at least one oxygen scavenger that binds dissolved oxygen within an aqueous carrier.

50. A mixture as in claim 45 wherein the anti-corrosive package additionally comprises at least one film forming corrosion inhibitor in an amount of 8-20 wt %, based on the weight of the anti-corrosive package.

51. A mixture comprising an anti-corrosive package and a release agent which provides release properties to lignocellulosic materials when molded with metal molds and platens to form oriented strand board at levels from 0.1-1.0 milligrams of solids/cm$^2$ of surface area,
   said anti-corrosive package comprising two or more of the following anti-corrosive agents:
   A) at least one metal passivator that forms a protective film on steel selected from the group consisting of chromate, nitrite, nitrate, phosphate, tungstate and molybdate; and/or
   B) at least one carbonic acid neutralizer which is morpholine, diethylaminoethanol, cyclohexylamine, or a combination thereof, and/or
   D) at least one oxygen scavenger that binds dissolved oxygen within an aqueous carrier that is diethylhydroxylamine, a sulfite, an alkyl or aryl hydrazine, a tannin, a carbohydrazide or a mixture thereof.

52. A mixture as in claim 51 wherein the anti-corrosive package additionally comprises at least one film forming corrosion inhibitor.

53. A mixture as in claim 52 wherein the film forming corrosion inhibitor is used in an amount of 8-20 wt %, based on the total weight of the anti-corrosive package.

54. A mixture as in claim 51 wherein
   diethylhydroxylamine is used as an oxygen scavenger in an amount of 10-20 wt %, based on the total weight of the anti-corrosive package;
   morpholine, diethylaminoethanol, cyclohexylamine, or a combination thereof is used as the neutralizer for carbonic acid in an amount of 5-20 wt % each, based on the weight of the anti-corrosive package and
   optionally, chromate, nitrite, nitrate, phosphate, tungstate or molybdate is used as a metal passivator in an amount that falls within the range of 5%-20%, based on the total weight of the anti-corrosive package.

55. A method of using an anti-corrosive package comprising two or more of the following anti-corrosive agents:
   A) at least one metal passivator that forms a protective film on steel; and/or
   B) at least one carbonic acid neutralizer which is an organo amine, and/or
   C) at least one film forming corrosion inhibitor, and/or
   D) at least one oxygen scavenger that binds dissolved oxygen within an aqueous carrier,
   said method comprising applying said anti-corrosive package to either a) the surface of a mold or platen used to mold lignocellulosic materials into oriented strand board, b) lignocellulosic materials used to form oriented strand board or c) both a) and b).

* * * * *